United States Patent

[11] 3,567,950

| [72] | Inventor | Heinrich Meyer |
| --- | --- | --- |
| | | Liverpool, N.Y. |
| [21] | Appl. No. | 852,699 |
| [22] | Filed | Aug. 25, 1969 |
| [45] | Patented | Mar. 2, 1971 |
| [73] | Assignee | General Electric Company |

[54] DRAWING-TO-TAPE PROGRAMMER WITH PHOTOELECTRIC SCAN POSITION ENCODING
5 Claims, 4 Drawing Figs.

[52] U.S. Cl. ..................................................... 250/219,
33/1, 178/18
[51] Int. Cl. ..................................................... G08c 9/06,
G01n 21/30
[50] Field of Search .......................................... 250/219
(IA), 219 (ID), 202, 231; 178/18; 33/1 (N)

[56] References Cited
UNITED STATES PATENTS

| 3,209,996 | 10/1965 | Carson et al. | 33/1X |
| 3,293,651 | 12/1966 | Gerber et al. | 33/1X |
| 3,297,879 | 1/1967 | Meyer | 250/202X |
| 3,366,794 | 1/1968 | Alvarez | 250/202X |
| 3,394,291 | 7/1968 | Hill | 318/18 |
| 3,403,263 | 9/1968 | Hargens | 250/219X |

*Primary Examiner*—Walter Stolwein
*Attorneys*—Carl W. Baker, Frank L. Neuhauser, Oscar B. Waddell and Joseph B. Forman ABSTRACT: Apparatus for translating position coordinates of points on a multidimensional display into binary information for recording in form suitable for use with numerical control equipment. More specifically, a drawing-to-tape programmer is described comprising a scanning assembly movable along orthogonally related coordinate axes into registration with each point to be recorded, the position coordinates of that point being encoded by photoelectric sensor arrays movable with the scanning assembly along binary coding scales each paralleling one of the coordinate axes and apertured to pass light to the associated photosensor array in a coded pattern providing unambiguous indication of the position coordinate along that axis. Rack and detent members with the rack teeth spaced correspondingly to the coding scale aperture spacing are provided for assuring alignment of the photosensor array with those coding scale apertures nearest to correspondence with the point to be translated, then locking the scanning assembly against further movement along that coordinate axis until read-out is completed. Means also are provided for marking each point as read, for preventing repeat of read-out, and for limiting read-out information, to the minimum essential to define position coordinates newly changed.

INVENTOR:
HEINRICH F. MEYER,
BY  C. W. Baker
HIS ATTORNEY.

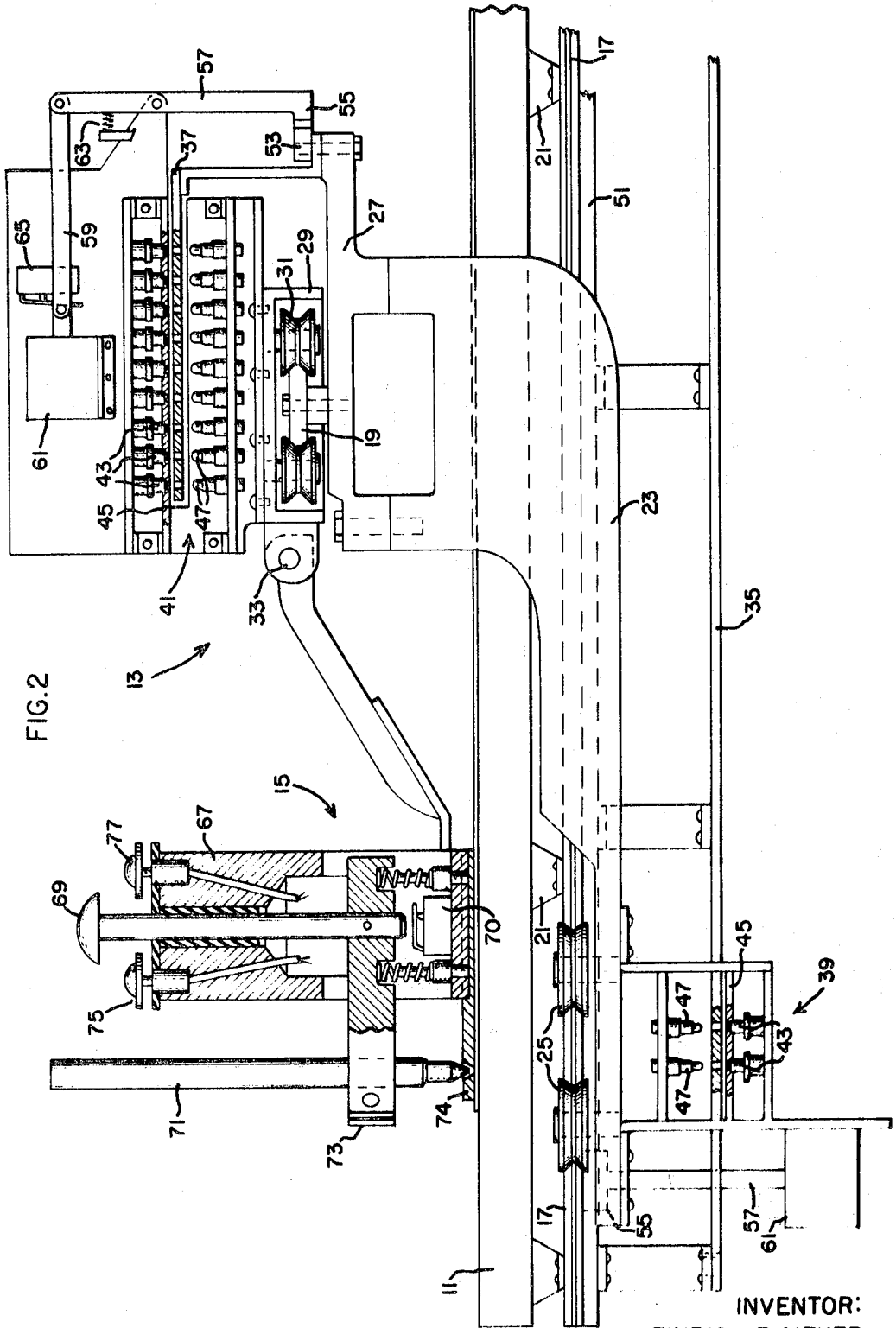

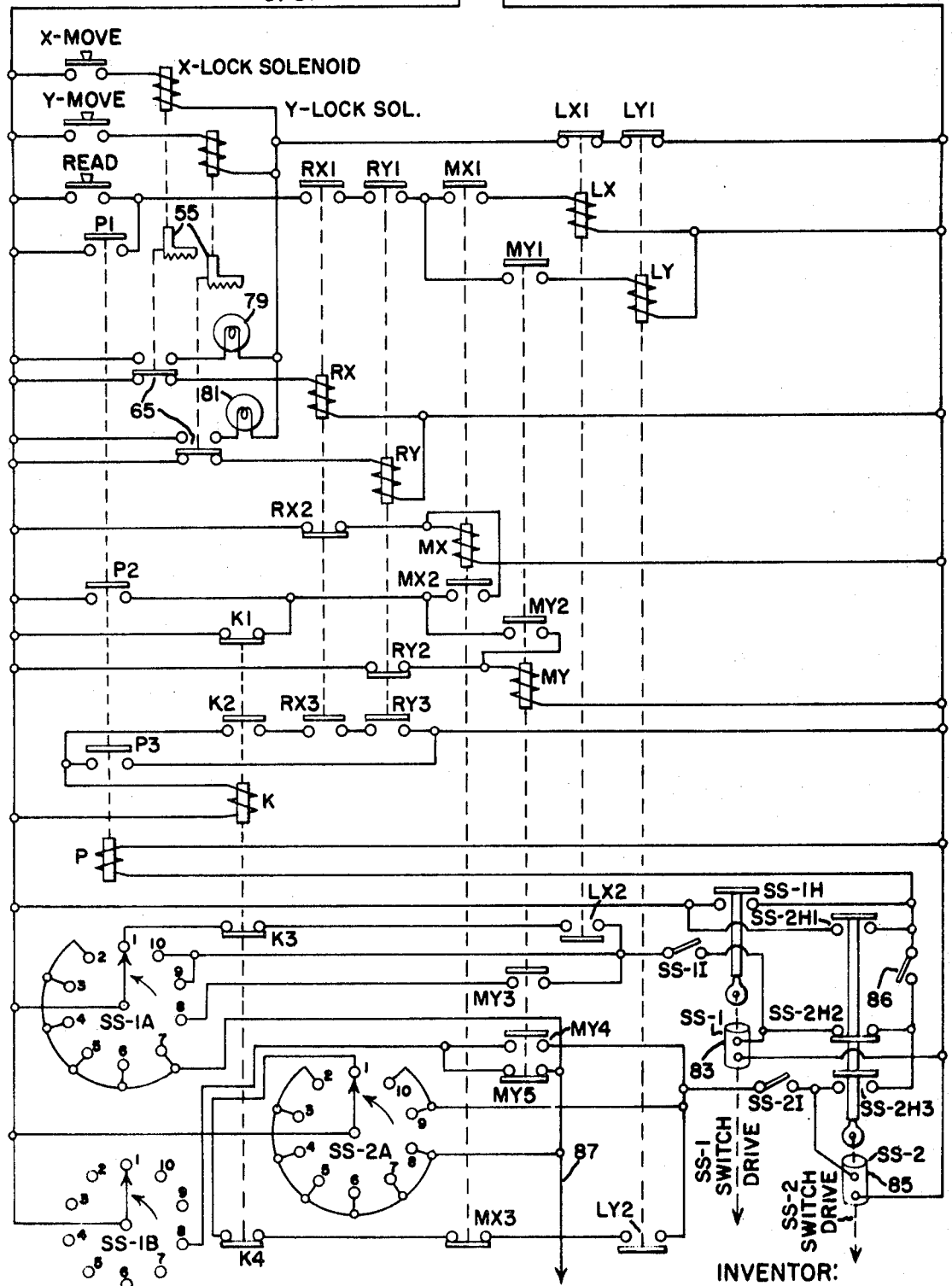

3,567,950

DRAWING-TO-TAPE PROGRAMMER WITH PHOTOELECTRIC SCAN POSITION ENCODING

BACKGROUND OF THE INVENTION

This invention relates to apparatus for translating position coordinates of points on grid-plotted multidimensional displays into binary information and recording the information in form suitable for use in digital computation or numerical control apparatus, and more specifically is directed to a drawing-to-tape programmer for deriving ld digitally coded programming information from analogue drawings for use in control of point-to-point operating machines.

Still more specifically, the present invention relates to drawing-to-tape programmers of the general kind disclosed in U.S. Pat. No. 3,022,501 — Seigle and U.S. Pat. No. 3,394,291 — Hill, both assigned to the assignee of the present application, and has as its principal objective the provision of drawing-to-tape programmers which, for many applications, offer advantages over these and other prior programmers particularly with respect to simplicity of structure, economy and facility of use. Additionally, the programmer of this invention affords significant cost advantages attributable in large part to the adaptability of the programmer to addition to commercially available drafting tables of comparatively low cost.

The programmers of the Hill and Seigle patents are representative of a variety of devices currently in widespread use for translating information from engineering drawings or models directly on to magnetic or punched tapes used for control of drills or other machines, which operate under control of such tape to perform operations on a workpiece in conformance with dictates of the drawing. To produce a printed wiring board, for example, a drawing of the board is made showing locations of the holes to be drilled, these preferably being all located at intersections of grid lines with predetermined spacing, typically 0.1 inch corresponding to the widely used "tenth inch" grid. The drawing is placed on the programmer with their respective origins coincident and their respective coordinate axes parallel, and the operator then moves a locator such as a stylus to each point on the drawing at which a function or operation is to be performed on the workpiece. At each such point the readout produces signals indicative of the distance along each axis between the origin and the present position of the locator or stylus, these signals being recorded on some medium such as punched paper tape or magnetic tape, which may be used directly to control a numerically controlled machine such as a drill, or fed to a digital computer for performing computation requiring such position input.

SUMMARY OF THE INVENTION

In brief, drawing-to-tape programmers in accordance with the present invention incorporate a scanning assembly, which as described may conveniently be mounted to a drafting table of commercially available type, enabling the scanning assembly to be moved over the plotting board along orthogonally related coordinate axes into registration with any desired point on drawings placed on the board. To accurately determine the position coordinates of such points, there are provided two binary coding scales each disposed parallel to one coordinate axis and apertured in a binary coded pattern providing unambiguous identification of the particular grid line normal to that axis on which the point lies. Photoelectric sensor arrays movable with the scanning assembly provide the desired read-out of the coding scale binary pattern for each of the position coordinates. For assuring alignment of the photosensor array with the coding scale apertures corresponding to the grid line near to the point to be translated, there are provided rack and detent members with the rack teeth spaced correspondingly to the grid line spacing and with actuation means under control of the user. Such actuation means comprises user-controlled switches and indicators which serve to provide the desired function of centering the scanning assembly with the nearest grid line intersection, indicating to the user when such centering has been accomplished with regard to each coordinate axis individually, and locking the scanning assembly against further movement along the respective coordinate axis until readout is completed. Means also are provided for marking each point as read, for preventing repeat readout, read-out, and for limiting read-out information to the minimum essential to define those position coordinates which have changed since the preceding readout.

BRIEF DESCRIPTION OF THE DRAWINGS

The foregoing and other objects, features, and advantages of the invention will become more fully apparent and the invention further understood by reference to the following detailed description when read in conjunction with the accompanying drawings, wherein:

FIG. 2 is a part sectional side elevation of the programmer of FIG. 1; and

FIGS. 3A and 3B together constitute an elementary circuit diagram of the encoding and control circuitry for the programmer of FIG. 1, but including encoder circuitry for the X-coordinate only,

DESCRIPTION OF PREFERRED EMBODIMENT

Figure 1:
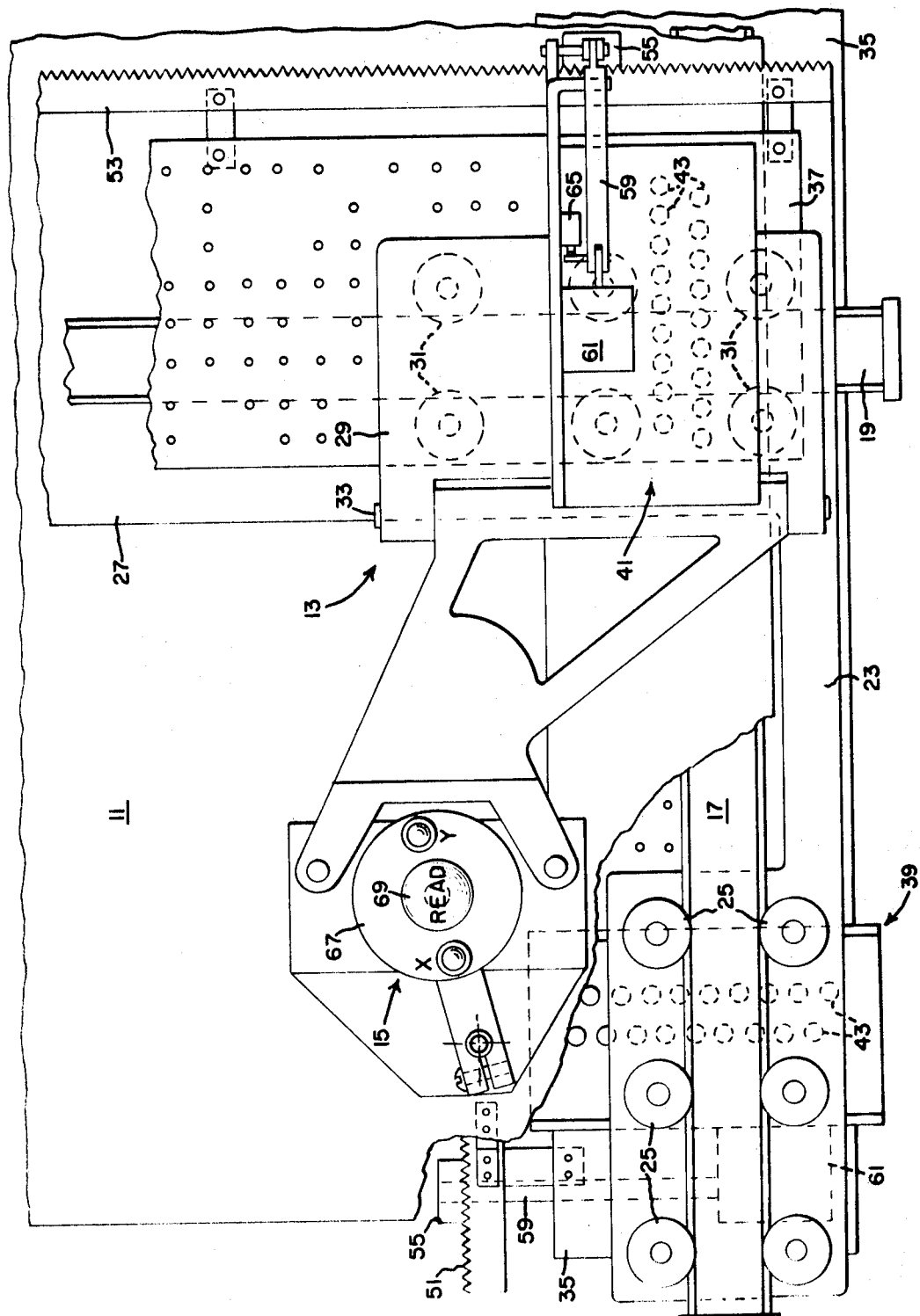
FIG. 1 is an elevation of a programmer in accordance with the invention, with a portion of the plotting board to which the programmer is mounted being broken away.

With continued reference to the drawings, wherein like reference numerals have been used throughout to designate like elements, FIG. 1 illustrates a preferred embodiment of the invention as applied to a drafting table of commercially available type. This table comprises a plotting board 11 of size adequate to accommodate the drawing to be transcribed, and a scanning assembly designated generally by reference numeral 13.

To enable the scanning head 15, which forms part of scanning assembly 13, to be moved along both X and Y coordinate axes, there is provided a track 17 running parallel to the X axis and a track 19 running parallel to the Y axis, for the full width and depth of the board, respectively. Track 17 may be mounted beneath the board 11 as by hangers 21 affixed to the underside thereof as best shown in Fig. 2, and this track supports for movement along its length a carriage member 23 provided with rollers 25 engaging opposite faces of the track. Carriage 23 has affixed thereto a traverse bar 27 extending the depth of the board and having affixed thereto the other track 19. Movable along this second track is a scanning head carriage 29 which is roller mounted as at 31 to the track in generally the same manner as described for the traverse bar carriage 23.

As will be obvious from what already has been said, the scanning heat 15 may freely move in the Y direction by movement of the scanning head carriage 29 along track 19, and may freely move in the X direction by movement of the traverse bar carriage 23 along track 17. One further degree of freedom of movement of the scanning head 15 is provided by a pivot as at 33, which enables the scanning head 15 to be lifted up and away from the surface of the plotting board 11 to permit more convenient placement of drawings thereon.

For detecting the position of the scanning scanning head and traverse bar carriages along the Y and X coordinates, respectively, the tracks 17 and 19 along which these carriages move are paralleled by binary code plates 35 and 37 each extending substantially the full length of its associated track as shown. Mounted to the carriages are photosensor assemblies 39 and 41 cooperative with the coding plates 35 and 37, respectively, to provide binary encoded readouts of carriage position along the two axes. Each such photosensor assembly comprises an array of photocells 43 the light sensitive elements in which are directed through stops formed in a shield 45 towards a like array of incandescent lamp bulbs 47, light transmission between the bulbs and photosensors being controlled by the presence or absence of holes in the coding plate 35 or 37 at the particular point at which the carriage then stands. The coding plate hole or aperture pattern is such as to define, in binary numbers, a position coordinate in the form described for example in detail in the Seigle U.S. Pat. No. 3,022,501.

Since readout is to be produced only for points which lie precisely on grid line intersections, it is necessary to assure that the scanning head 15 is positioned over and remains in registration with a grid line intersection during readout, and for this purpose means are provided for indicating the existence of such registration and locking the scanning head and traverse bar carriages against further movement which might disturb it until readout is accomplished. To this end, the carriage tracks 17 and 19 are paralleled by rack members 51 and 53, respectively, the racks having tooth spacing corresponding to the spacing between grid lines. For example, with a tenth inch grid the rack teeth would be precisely on one-tenth inch centers.

Each rack is engaged by a detent 55 carried on one end of a locking lever 57 having its other end connecting through link 59 to a solenoid 61 which, when energized, lifts the detent from the rack and permits free relative movement between the carriage and track. Lever 57 is spring loaded as at 63 into engagement with the rack member 55, except when the solenoid 61 is energized as just explained.

If after movement of the scanning assembly in either of its two directions of movement, the assembly happens to stop at a position such a that when the detent 55 is returned by spring 63 into reengagement with the rack the detent and rack teeth engage in crest-to-crest fashion, that is, the teeth on the detent and rack do not mesh, this indicates that the scanning head is not positioned precisely over a grid line intersection but falls between two grid lines. To enable flagging this condition to the attention of the operator and to prevent readout until the condition has been corrected, a microswitch 65 is arranged as shown to be switched by the operating arm of solenoid 61 whenever spring 63 is unable to return the detent lever 57 to the fully meshed position due to crest-to-crest engagement of the detent and rack teeth. The manner in which the electrical signal output of microswitch 63 is utilized to accomplish these purposes will be explained later in connection with the electrical circuit diagrams of FIGS. 3A and 3B.

The scanning head 15 itself comprises a handle member 67 having a "READ" button 69 slidable therein and operable, when depressed for read-out, to drive downwardly and trip a microswitch 70 providing a read-out signal utilized in the manner hereinafter explained. Depressing the READ button also is effective to place a marker on the particular point which has been thus read out, this being accomplished by a marking implement 71 such as a conventional felt tip pen which is detachably mounted to a pen holder 73 affixed to the READ button 69 and movable therewith. A transparent plastic plate 74 apertured to pass the pen tip and provided with cross hairs as shown in FIG. 1 is affixed to the scanning head to facilitate its location over the desired point.

The scanning head further comprises a pair of pushbutton switches 75 and 77, each preferably including an integrally built signal light, which control the solenoids 61 and thus control the locking and unlocking of the scanning assembly for movement in the X and Y directions, respectively. As will be more fully explained in discussion of the electrical circuit diagrams, depression of either or both of these switches is necessary to unlock the detent and rack lock to thereby enable movement along the indicated coordinate axis. After such movement, and upon release of the switch, extinction of the light serves to indicate whether the corresponding detent and rack have reengaged and fully meshed. If a light remains on this indicates to the operator that the scanning head must be adjusted into better registration with the point prior to attempting its readout. Switches 75 and 77 may be conventional momentary contact pushbutton switches with integral light and these switches are operative in circuits of FIGS. 3A and 3B in the manner next to be explained.

Referring first to the portion of the circuit shown in FIG. 3A, the switch contacts designated "X-MOVE" and "Y-MOVE" correspond to the pushbutton switches 75 and 77 in FIGS. 1 and 2, and as shown each is connected in series circuit relationship with the X-LOCK or Y-LOCK solenoid 61 to control its operation. These solenoids directly control the locking and unlocking of the X and Y rack and detent mechanisms, and through them also control the microswitches 65 which as previously explained are tripped whenever the corresponding rack and detent are not fully meshed and locked. The microswitch contacts are wired to control the "lock" lights 79 and 81 and two relays RX and RY in the manner shown.

These relays are cooperatively interrelated with two other relays designated MX and MY, respectively interconnected with the RX and RY relays in the arrangement shown. In operation of the circuitry thus far described, and assuming first that neither the X-MOVE nor the Y-MOVE switch has been closed since the last readout, the lock detents and racks will remain meshed and the contacts of microswitches 65 will be in the positions in which illustrated, causing relays RX and RY controlled thereby to be picked up. Relays MX and MY will both remain deenergized, because the current supply thereto through relay contacts RX2 is cut off and because relay contacts P2 and K1 are open as will be explained later in connection with discussion of the operation of the P and K relays. Finally, relays LX and LY both are deenergized, because the contacts MX1 and MY1 through which their coils are supplied both are open. It will be noted that under these conditions depression of the of the READ switch 69 will not result in any response from the system; position information accordingly cannot be read out until there has been a change in either the X or Y position coordinate since the preceding read-out.

To accomplish such a change in, for example, the X coordinate, the X-MOVE switch is depressed, energizing the X-LOCK solenoid to disengage the X-axis rack and detent mechanism and enable movement of the scanning head in the X direction. At the same time, the departure of the X-LOCK detent from its meshed condition with the X-axis rack operates to trip the associated microswitch 65 thus switching on the indicator light 79 and deenergizing relay RX. As this relay drops out, its contacts RX2 close a circuit to the coil of relay MX, causing it to pick up and to latch through its latching contacts MX2 and the normally closed contacts K1 of relay K. This closes the MX1 contacts in the "read" circuit, but the READ switch still is disabled by virtue of the now open contacts RX1 in the circuit.

After the desired movement along the X axis has been accomplished the X-MOVE switch is released and the X-LOCK solenoid will drop out, allowing the X-axis detent and rack mechanism to reengage. If the detent and rack teeth should engage in crest-to-crest fashion, microswitch 65 will remain tripped, with indicator light 79 still remaining on and relay RX remaining dropped out. After the operator effects any such readjustment of scanning head position as proves necessary to extinguish the indicator light 79, the microswitch contacts then will revert to the position shown in FIG. 3A and will again energize the relay RX. It will be noted that relay MX remains picked up, not withstanding the opening of relay contacts RX2 in one of its supply circuits, due to the other such circuit remaining closed through latching contacts MX2.

Readout now is possible, because closing of the READ switch will complete a circuit through relay contacts RX1, RY1 and MX1, and through relay coil LX. Energization of this relay disables both the X-MOVE and Y-MOVE circuits by opening the relay contacts LX1, and at the same time it initiates readout through closing contacts LX2.

Figure 3B:
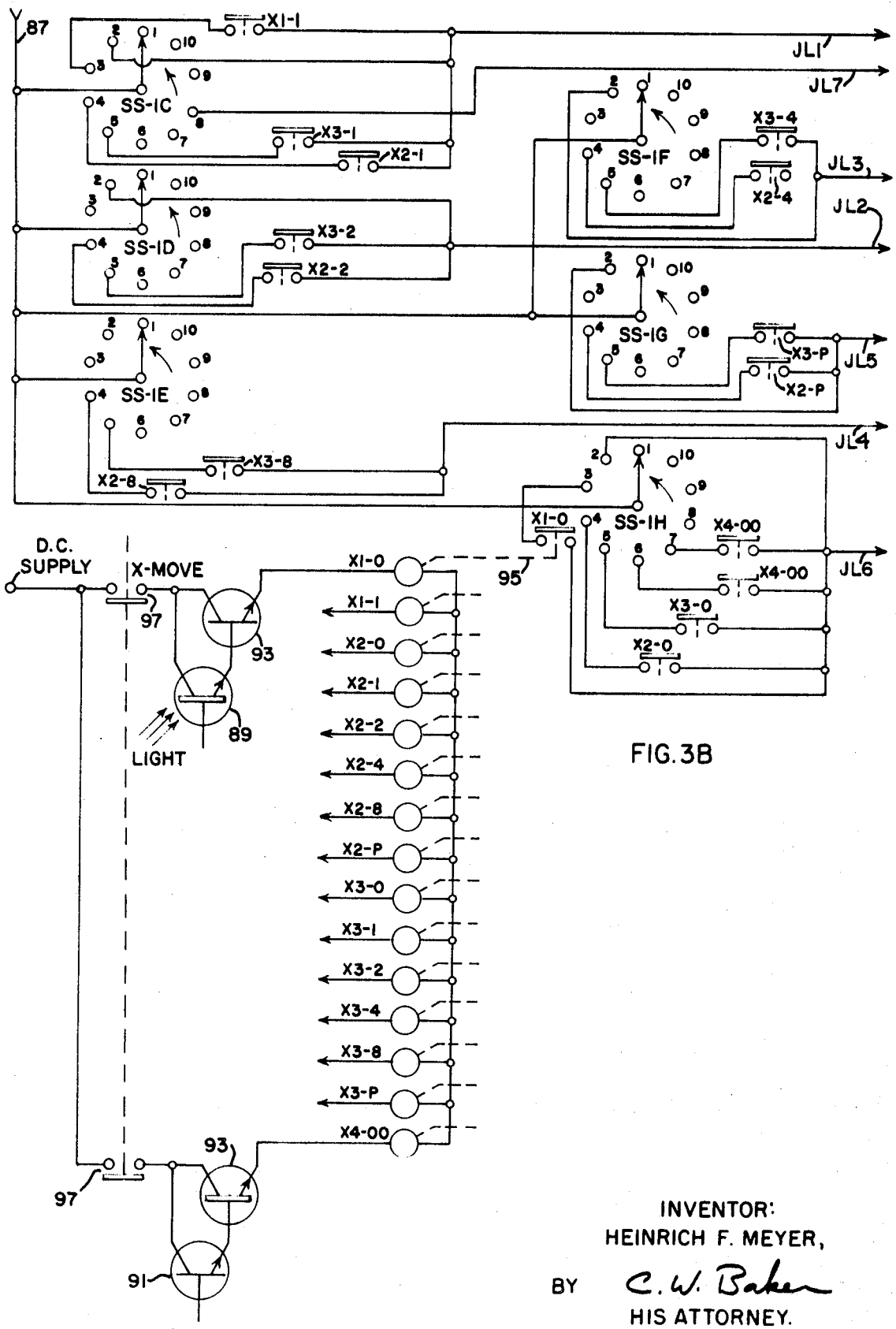

Actual readout is accomplished by a pair of conventional multigang stepping switches SS–1 and SS–2 the step drive motors for which are shown at 83 and 85 respectively, in FIG. 3A. The first two gangs (designated A and B) of switch SS–1 and the A gang of switch SS–2 are used as part of the read sequencing control now to be described; the remaining six gangs (C–H) of both switches serve to encode the output signals of the scanning assembly photosensor arrays in binary form suitable for punched tap recording as will more fully be explained in the discussion of FIG. 3B to follow.

The read sequencing control also employs the two relays P and K previously mentioned, as well as certain of the contacts of the LX, LY, MX and MY relays. When the READ switch button is depressed and relay LX is energized in the manner just explained, its contacts LX2 in the power supply circuit to the drive motor 83 of stepping switch SS–1 close and the drive motor is energized through those contacts, through normally closed contacts K3, through stepping switch contacts SS–1A1 and through the stepping switch interrupter contacts designated SS–1I Stepping switch SS1 accordingly will take on step.

As it does so, it closes a normally open "home" position switch SS–1H, thus energizing relay P which will remain energized until the stepping switch has stepped through its cycle and again reaches "home" position. Contacts P1 of relay P close to bypass the READ switch, to assure that read-out is completed even though the READ switch is only momentarily depressed by the operator. Relay contacts P2 close to complete a circuit paralleling that closed through relay contacts K1, so as to hold whichever or both of the relays MX and MY may already have been latched through the K1 contacts. The remaining contacts P3 of relay P serve to close a circuit including relay K, which then closes its contacts K2 thus latching itself on through contacts RX3 and RY3 which now are closed. The two remaining K relay contacts, namely K3 and K4, open and thus break the circuits through which the stepping switch drive motors may be energized when the stepping switches are in their respective "home" positions.

After stepping switch SS–1 departs from its "home" position it will not be further energized through its A-gang contacts until its wiper arm reaches position 9, because none of contacts A2–7 have any connection and the A–8 contact connects to the drive motor only through relay contacts MY3 which now are open. The SS–1 drive motor does remain energized, however, through "home" position contacts SS–1H and SS–2H2 so long as these latter contacts are closed. SS–1H will remain closed until SS–1 has stepped through its entire cycle, and SS–2H2 will not open at all because the LY2 contacts in the lead from SS–2A1 are open, as well as relay contacts MX3, and stepping switch SS–2 accordingly will remain unenergized and in its "home" position.

Since switch SS–1 remains energized through contacts SS–2H2 and SS–1H, it will step through its complete cycle and in the process will output a set of binary coded signals for the new X position coordinate position, these signals being derived in a manner to be explained later with reference to FIG. 3B. It will be noted that during one portion of its cycle SS–1 is energized through its interrupter switch SS1I and during another portion through a make-break switch designated 86 in FIG. 3A. This switch 86 is driven by the tape punch unit (not shown) and serves to limit the SS–1 and SS–2 stepping rates to prevent their getting ahead of the punch during the portion of the cycle through which information is being read out to it. At other times stepping rates are controlled by the interrupter switches and can be higher.

When stepping switch SS–1 again reaches the starting position shown, relay contacts K3 now will stand open, and the switch "home" position contacts SS–1H will open. Stepping switch SS1 accordingly will halt in this "home" position, and the system will remain in the condition thus established until the next operating cycle is initiated by closing one or the other of the X-MOVE and Y-MOVE switches.

Had the input been a change in the Y coordinate rather than one in the X coordinate as described, the operation would be essentially the same except that here the SS–1 stepping switch remains idle and does not depart from its "home" position as shown, and only stepping switch SS–2 is energized. Such energization is accomplished through the SS–2A1 contacts of stepping switch SS–2 and through normally closed contacts K4, normally closed contacts MX3, and contacts LY2 which now are closed by reason of the movement in the Y direction. Once switch SS–2 departs from its "home" position, the SS–2H3 contacts close and remain closed so as to continue to drive the SS–2 stepping switch through the remainder of its cycle, providing Y coordinate position readout.

In the event there has occurred both X direction and Y direction movements since the last read-out, both the MX and MY relays will have been energized and both the stepping switches SS–1 and SS–2 will be fully cycled. The SS–1 switch first moves alone in the manner previously described until it reaches position 8 thus completing read-out of the X-coordinate information. At position 8 of SS–1, contacts will close in its B gang supplying power through relay contacts MY4, which now are closed, to energize the SS–2 switch drive motor. As switch SS–2 moves from its "home" position, contacts SS–2H3 and SS–2H1 will shift from the positions shown to latch the SS–2 switch drive on. Switch SS–2 accordingly steps on through the remainder of its cycle, reading out the Y position coordinate to the recording device.

Switch SS–1 meanwhile completes its own cycle, being energized sequentially through contacts SS–1A8 and MY3, then SS–1A9 and finally SS–1A10. After both switches have completed their cycles their "home" contacts will return to the positions illustrated, thus terminating the read-out cycle and also dropping out the relay P to enable repetition of the operation.

It will be noted that as indicated near the bottom of FIG. 3A and top of FIG. 3B, the wiper arms of all the remaining gangs of each of the stepping switches SS–1 and SS–2 have common connections to a lead 87 which is connected to certain contacts on switch gangs SS–1A and SS–2A selected so as to permit signal output from the encoder only when the stepping switches are in positions for which readouts are appropriate. More specifically, the arrangement shown prevents readout from switch SS–1 when in its number 8 position if relay MY has been energized (and contacts MY5 are open) indicating the existence of Y coordinate information to be read out; otherwise an "end of block" signal would be generated as hereinafter explained and this of course would be inappropriate under these circumstances.

Referring now to FIG. 3B, only the X encoding half of the system is illustrated since the Y encoding circuitry is essentially identical differing primarily in designation of the circuit elements. As shown, the X encoder comprises the remaining gangs C—H of stepping switch SS–1, which selectively transmit the input voltage on lead 87 to the output leads designated JL1—JL7 connecting to the tape punch or other recorder device (not shown). The SS–1 switch contacts interposed in these connections perform the required encoding of the photosensor array outputs into binary form suitable for recording.

The SS–1 contacts all are normally open as shown, and are controlled by relays designated X1–O X1–1, and so on through X4–00. These relays are each individually controlled by one of the photoelectric sensor elements, two of which are illustrated in FIG. 3B at 89 and 91. Each photocell may be provided with a transistor amplifier stage 93 which is in series therewith, and through which the photocell controls the associated relay coil such as X1–0 in the case of photocell 89. It will be appreciated that each of the other photocells is provided with similar amplification means, and that the relays energized thereby control the correspondingly labeled relay contacts in the upper portion of FIG. 3B as indicated by the dotted line 95 connecting the one relay coil labeled X1–0 to its similarly labeled contacts in the lead from SS–1H3 to JL6.

To prevent chattering of these relays as the scanning head is moved along the apertured X coding scale, each of the relay drive amplifier circuits has interposed therein switch contacts 97 which, as indicated, open with the X-MOVE switch or are controlled by the X-LOCK solenoid so as to be open whenever the solenoid is energized to permit scanning head motion in the X direction. Such switching is not essential to operation of the invention but does eliminate actuation of the encoding relays except prior to readout.

The binary encoding accomplished by the circuit of FIG. 3B preferably is the EIA/AIA standard as explained at greater length in the aforementioned Seigle—3,022,501 patent. The binary encoded output is transmitted on leads JL–1 through JL–6. Lead JL–7 outputs an "end-of-block" signal when SS–1 reaches position 8 if there is to be no Y coordinate readout (Contacts MY5 are closed) or when SS–2 reaches that position if there is Y information to be recorded.

From the foregoing it will be obvious that the drawing-to-tape programmer of this invention affords versatility and convenience of operation, while at the same time being of relatively simple structure and correspondingly low in cost. It will be appreciated by those skilled in the art that many modifications and substitutions may be made within the scope of the invention as described, as for example in the encoding program utilized and in the mechanical arrangement of the scanning assembly and its mounting to the plotting board.

I claim:

1. Apparatus for sensing position and translating position coordinates of points on a multidimensional display into digital information, comprising:
   a plurality of digital coding scales disposed in mutually orthogonal relation with each extending along a different coordinate axis and having apertures therein arranged in rows spaced along that axis;
   a scanning assembly including a like plurality of photosensor arrays and means mounting said arrays to enable each to move along one of said digital coding scales into successive registration with each of said coding aperture rows therein;
   a like plurality of toothed rack members each extending parallel to one of said digital coding scales and having its teeth spaced correspondingly to the spacing between said coding aperture rows;
   a like plurality of locking means carried by said scanning assembly and including toothed detent members each movable into and out of meshing engagement with one of said rack members and operable when engaged to lock the scanning assembly against movement in the direction paralleled by that rack member;
   a like plurality of detent control means each comprising operator controlled electrical actuating means for effecting disengagement of said detent from said rack member and spring loading means for returning said detent into engagement with said rack member;
   a like plurality of switch means each actuated by one of said detent members on its departure from and return to fully meshed relation with the associated rack member;
   readout means selectively operable to encode the output of said photosensor arrays when in registration with said coding aperture rows to provide indication of the position coordinates of the corresponding point; and
   means operative under control of said switch means for disabling said read-out means except when all said detent members are fully meshed with their respective rack members and identifying any rack member not thus meshed.

2. Apparatus as defined in claim 1 further including means operative under control of said switch means to disable said readout means against readout of position coordinates except those on coordinate axes along which scanning assembly movement has been enabled by disengagement of said detent and rack members since the preceding readout.

3. Apparatus as defined in claim 1 further including means operative under control of said readout means to disable said detent actuating means during readout.

4. Apparatus for translating points on a two-coordinate graphic display into binary information, comprising:
   a pair of binary coding scales disposed in orthogonal relation with each extending along one of the two coordinate axes and having apertures therein arranged in rows spaced along that axis;
   a scanning assembly including a pair of photosensor arrays and means mounting said arrays to enable their movement each along one of said binary coding scales into successive registration with each of said coding aperture rows therein;
   readout means selectively operable to encode the output of said photosensor arrays when in registration with said coding aperture rows to provide binary indication of the position coordinating of the corresponding point;
   a pair of toothed rack members each extending parallel to one of said binary coding scales and having its teeth spaced correspondingly to the spacing between said coding aperture rows;
   a pair of toothed detent members carried by said scanning assembly and movable into and out of meshing engagement with one of said rack members to lock said detent and rack members against relative movement when meshed;
   operator controlled means selectively operable to engage and disengage said detent and rack members to permit motion of said scanning assembly in such direction as may be thus enabled; and
   control means actuated by said detent member and operative upon departure thereof from meshed engagement with said rack member to disable said readout means and to provide an indication of such departure to the operator.

5. Apparatus as defined in claim 4 wherein said operator controlled means comprise solenoid means operative when energized to disengage said detent from said rack member and spring loading means operative to return said detent into engagement with said rack member upon deenergization of said solenoid means, and wherein said control means comprises switch means coupled to said detent member and tripped thereby except when in fully meshed relation with said rack member.